US012683221B2

(12) United States Patent
Yan et al.

(10) Patent No.: US 12,683,221 B2
(45) Date of Patent: Jul. 14, 2026

(54) CELL, BATTERY, AND ELECTRIC APPARATUS

(71) Applicant: NINGDE AMPEREX TECHNOLOGY LIMITED, Ningde (CN)

(72) Inventors: Dongyang Yan, Ningde (CN); Mingyue Yuanyin, Ningde (CN); Yuyang Dong, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 601 days.

(21) Appl. No.: 18/193,049

(22) Filed: Mar. 30, 2023

(65) Prior Publication Data

US 2023/0238618 A1    Jul. 27, 2023

Related U.S. Application Data

(63) Continuation of application No. PCT/CN2021/073138, filed on Jan. 21, 2021.

(51) Int. Cl.
  *H01M 50/124*        (2021.01)
  *H01M 50/109*        (2021.01)
    (Continued)

(52) U.S. Cl.
  CPC ....... *H01M 50/124* (2021.01); *H01M 50/109* (2021.01); *H01M 50/181* (2021.01);
    (Continued)

(58) Field of Classification Search
  CPC ............. H01M 50/103; H01M 50/105; H01M 50/109; H01M 50/119; H01M 50/121;
    (Continued)

(56) References Cited

U.S. PATENT DOCUMENTS

2017/0279093 A1    9/2017  Park
2020/0343575 A1*  10/2020  Kim .................. H01M 10/0585

FOREIGN PATENT DOCUMENTS

CN        108428809 A     8/2018
CN        109860445 A     6/2019
      (Continued)

OTHER PUBLICATIONS

CN109860445 Machine translation (Year: 2025).*
    (Continued)

*Primary Examiner* — Lingwen R Zeng
(74) *Attorney, Agent, or Firm* — Maier & Maier, PLLC

(57)        ABSTRACT
A cell, including an electrode assembly and a shell. The electrode assembly includes tabs, and the electrode assembly is disposed in the shell. The shell includes a packaging part and a sealing part connected to the packaging part, where the sealing part is formed by extending the packaging part outward, the electrode assembly is located in the packaging part, and the tabs penetrate out of the sealing part. The packaging part includes a side wall, where notches are provided in the sealing part, the notches are formed by recessing an exterior circumferential edge of the sealing part towards a joint of the sealing part and the packaging part, and the sealing part is attached to the side wall.

18 Claims, 13 Drawing Sheets

(51) Int. Cl.
   *H01M 50/181*     (2021.01)
   *H01M 50/188*     (2021.01)
   *H01M 50/103*     (2021.01)
   *H01M 50/105*     (2021.01)
   *H01M 50/119*     (2021.01)
   *H01M 50/121*     (2021.01)
   *H01M 50/129*     (2021.01)
   *H01M 50/176*     (2021.01)
   *H01M 50/178*     (2021.01)
   *H01M 50/184*     (2021.01)
   *H01M 50/186*     (2021.01)
   *H01M 50/193*     (2021.01)
   *H01M 50/55*      (2021.01)
   *H01M 50/553*     (2021.01)
   *H01M 50/557*     (2021.01)
(52) U.S. Cl.
   CPC ........ *H01M 50/188* (2021.01); *H01M 50/103*
      (2021.01); *H01M 50/105* (2021.01); *H01M*
      *50/119* (2021.01); *H01M 50/121* (2021.01);
         *H01M 50/129* (2021.01); *H01M 50/176*
      (2021.01); *H01M 50/178* (2021.01); *H01M*
      *50/184* (2021.01); *H01M 50/186* (2021.01);
         *H01M 50/193* (2021.01); *H01M 50/55*
      (2021.01); *H01M 50/553* (2021.01); *H01M*
         *50/557* (2021.01); *Y02E 60/10* (2013.01)
(58) Field of Classification Search
   CPC ............. H01M 50/124; H01M 50/129; H01M
      50/176; H01M 50/178; H01M 50/181;
      H01M 50/184; H01M 50/186; H01M
         50/188; H01M 50/193; H01M 50/55;
         H01M 50/553; H01M 50/557; Y02E
                                      60/10
   See application file for complete search history.

(56)                References Cited

FOREIGN PATENT DOCUMENTS

| CN | 109997242 A | 7/2019 |
|----|-------------|--------|
| CN | 110197923 A | 9/2019 |
| CN | 110350112 A | 10/2019 |
| CN | 209526141 U | 10/2019 |
| CN | 111712939 A | 9/2020 |
| CN | 211605200 U | 9/2020 |
| CN | 212209647 U | 12/2020 |
| CN | 112490491 A | 3/2021 |
| CN | 212967849 U | 4/2021 |
| CN | 213583901 U | 6/2021 |

OTHER PUBLICATIONS

International Search Report (English translation included) and Written Opinion issued on Oct. 20, 2021, in corresponding International Application No. PCT/CN2021/073138, 10 pages.
Office Action issued on Dec. 28, 2022, in corresponding Chinese Application No. 202180002842.9, 10 pages.
Office Action issued on May 18, 2023, in corresponding Chinese Application No. 202180002842.9, 18 pages.
Office Action issued on Aug. 4, 2023, in corresponding Chinese Application No. 202180002842.9, 14 pages.

* cited by examiner

100

100b

100c

300

CELL, BATTERY, AND ELECTRIC APPARATUS

CROSS REFERENCE TO THE RELATED APPLICATIONS

This application is a continuation under 35 U.S.C. § 120 of international patent application PCT/CN2021/073138 filed on Jan. 21, 2021, the entire content of which is incorporated herein by reference.

TECHNICAL FIELD

This application relates to the field of battery manufacturing technologies, and in particular, to a cell, a battery, and an electric apparatus.

BACKGROUND

Existing smart wearable devices are powered by batteries therein. Common batteries are packaged by using metal shells, but excessively high product weight may lower user experience and satisfaction degree of users. To solve this problem, a soft package battery is used as a substitute in the prior art. The soft package battery resolves problems of overall weight and cost of the battery. However, with a sealing part of a packaging film perpendicular to a lateral side curved surface of a cylinder of a cell, an outermost perimeter of a bent circumferential surface of the sealing part is larger than a circumference of a cell body, leading to formation of wavy creases, as shown in FIG. 1, and such wavy creases waste a planar usable space of the cell.

SUMMARY

In view of this, it is necessary to provide a cell, a battery, and an electric apparatus, aiming to be able to resolve the problem of a wavy appearance of a sealing part.

An embodiment of this application provides a cell, including an electrode assembly and a shell. The electrode assembly includes tabs and is disposed in the shell. The shell includes a packaging part and a sealing part connected to the packaging part, where the sealing part is formed by extending the packaging part outward, the electrode assembly is located in the packaging part, and the tabs penetrate out of the sealing part. The packaging part includes a side wall, where notches are provided in the sealing part, the notches are formed by recessing an exterior circumferential edge of the sealing part towards a joint of the sealing part and the packaging part, and the sealing part is attached to the side wall.

In a possible implementation, the shell includes a first packaging film and a second packaging film; the first packaging film includes a first part and a first edge part connected to the first part, and the second packaging film includes a second part and a second edge part connected to the second part; and the first part and the second part enclose the packaging part, and the first edge part and the second edge part are connected to form the sealing part.

In a possible implementation, the first part is recessed to form a first accommodating cavity, where a vertical section of the first accommodating cavity is inverted U-shaped; and the second part is flat and seals the first part to form the packaging part.

In a possible implementation, the first part is recessed to form a first accommodating cavity, where a vertical section of the first accommodating cavity is inverted U-shaped; the second part is recessed to form a second accommodating cavity, where a vertical section of the second accommodating cavity is U-shaped; and the first accommodating cavity and the second accommodating cavity enclose the packaging part.

In a possible implementation, the notch is at least one of arc-shaped, V-shaped, semi-circular, U-shaped, and polygonal.

In a possible implementation, a minimum distance between an edge of the notch and the joint of the packaging part and the sealing part is greater than or equal to 0.5 mm.

In a possible implementation, the packaging part includes a first end surface and a second end surface opposite the first end surface, where the first end surface and the second end surface are respectively connected to the side wall, and a distance from the joint of the sealing part and the packaging part to the first end surface is greater than or equal to a distance from the joint to the second end surface.

In a possible implementation, the cell further includes a first bonding member, where one end of the first bonding member is disposed on the side wall, the first end surface, or the second end surface, and the other end of the first bonding member is disposed on a surface of the sealing part facing away from the packaging part, to fix the sealing part to the packaging part.

In a possible implementation, the cell further includes a second bonding member, where the second bonding member is disposed between the side wall and a surface of the sealing part facing toward the packaging part, to fix the sealing part to the packaging part.

An embodiment of this application further provides a battery, including a housing and any foregoing cell, where the cell is accommodated in the housing.

An embodiment of this application further provides an electric apparatus, including a body and the foregoing battery, where the battery is accommodated in the body.

For the cell, the battery, and the electric apparatus provided in this application, by providing notches in the sealing part and attaching the sealing part to the side wall of the packaging part, an area of the sealing part can be reduced, so that the sealing part can be flatter when being attached to the packaging part, effectively avoiding a wavy appearance between the sealing part and the packaging part.

Figure 1:
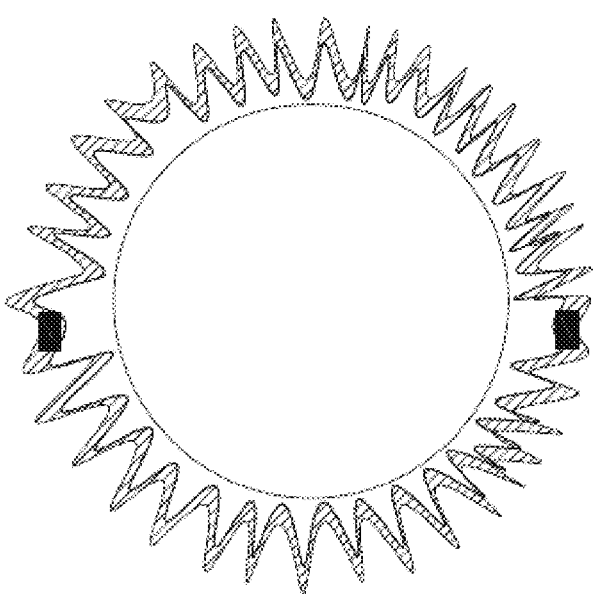
FIG. 1 is a schematic top view of a bent sealing part of a packaging film in the prior art.

| Reference signs of main components | |
| --- | --- |
| Cell | 100, 100a, 100b, 100c |
| Electrode assembly | 10, 10a |
| First electrode plate | 11 |
| Second electrode plate | 12 |
| First tab | 13 |
| Second tab | 14 |
| Insulating glue | 15 |
| Insulating sheet | 16 |
| Shell | 20, 20a |
| Packaging part | 21, 21a, 21b, 21c |
| Side wall | 211, 211a, 211b, 211c |
| First end surface | 212a, 212b |
| Second end surface | 213a, 213b |
| Sealing part | 22, 22a, 22b, 22c |
| Notch | 221 |
| Minimum distance | d |
| Joint | 23, 23a |
| First packaging film | 24, 24a |
| First part | 241, 241a |
| First edge part | 242, 242a |
| Second packaging film | 25, 25a |
| Second part | 251, 251a |
| Second edge part | 252, 252a |
| First bonding member | 26 |
| Second bonding member | 27 |
| Battery | 300 |
| Housing | 30 |
| Electric apparatus | 500 |
| Body | 50 |

DETAILED DESCRIPTION

The following describes the technical solutions in the embodiments of this application with reference to the accompanying drawings in the embodiments of this application. Apparently, the described embodiments are only some rather than all of the embodiments of this application.

It should be noted that, when one component is deemed as being "connected to" another component, it can be directly connected to the another component, or there can be a component in between. When one component is deemed as being "disposed on" another component, it can be directly disposed on the another component, or there can be a component in between. The terms "top", "bottom", "upper", "lower", "left", "right", "front", "rear", and other similar expressions as used herein are for illustration only.

Unless otherwise defined, all technical and scientific terms used herein shall have the same meanings as commonly understood by those skilled in the art to which this application belongs. The terms used herein in the specification of this application are only used to describe specific embodiments, and are not intended to limit this application.

An embodiment of this application provides a cell, including an electrode assembly (may be of a wound structure or a stacked structure) and a shell. The electrode assembly includes tabs, and the electrode assembly is disposed in the shell. The shell includes a packaging part and a sealing part connected to the packaging part, where the sealing part is formed by extending the packaging part outward, the electrode assembly is located in the packaging part, and the tabs penetrate out of the sealing part. The packaging part includes a side wall, where notches are provided in the sealing part, the notches are formed by recessing an exterior circumferential edge of the sealing part towards a joint of the sealing part and the packaging part, and the sealing part is attached to the side wall.

For the cell, by providing notches in the sealing part, and attaching the sealing part to the side wall of the packaging part, an area of a circumferential portion of the sealing part is reduce, so that the sealing part is flatter when attached to the packaging part, effectively avoiding a wavy appearance on a surface of the packaging part, thereby increasing utilization of the sealing part and also reducing an area occupied by the cell.

An embodiment of this application further provides a battery, including a housing and the foregoing cell, where the cell is accommodated in the housing.

The battery using the foregoing cell can further increase utilization of internal space of the housing. A smaller volume occupied by the cell facilitates optimization of an internal structure of the battery. Also, with a reduced volume occupied by the cell, volume of the battery can be accordingly reduced.

An embodiment of this application further provides an electric apparatus, including a body and the foregoing battery, where the battery is accommodated in the body.

A headset is taken as an example. The headset using the foregoing battery can more further reduce weight of the headset, bringing more comfortable experience to users.

The following describes the embodiments of this application with reference to the accompanying drawings. In absence of conflicts, the following embodiments and features in the embodiments may be combined.

Embodiment 1

Figure 2:
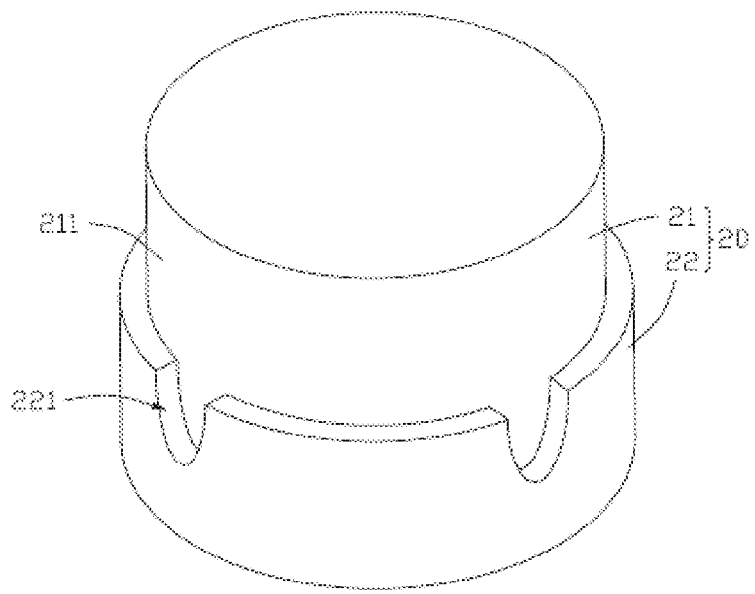
FIG. 2 is a stereoscopic schematic diagram of a cell according to an embodiment of this application.
Figure 3:
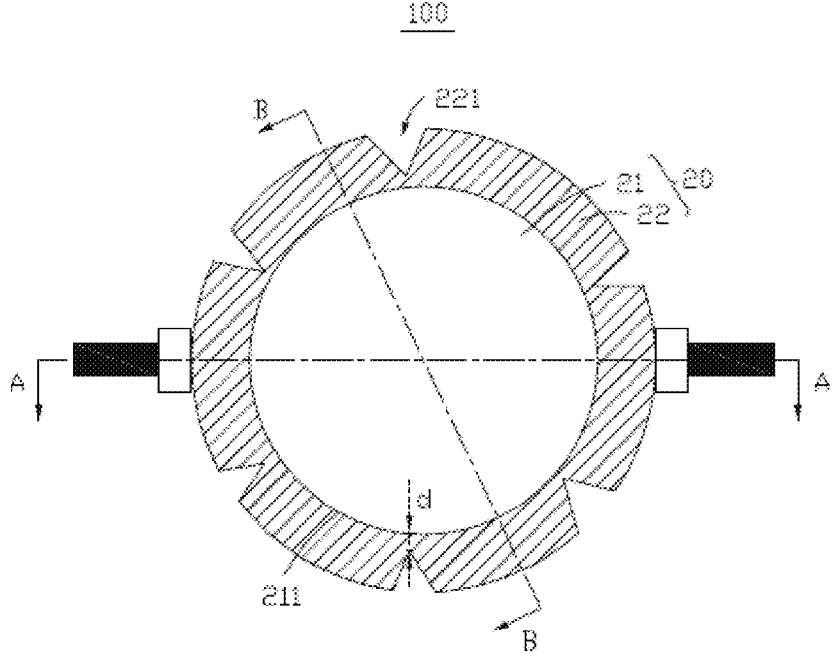
FIG. 3 is a first schematic top view of a sealing part not attached to a side wall of a packaging part in the cell shown in FIG. 2.

Referring to FIG. 2 and FIG. 3, the cell 100 provided in this application includes an electrode assembly 10 and a shell 20. With the electrode assembly 10 disposed in the shell 20 and the shell 20 configured to package the electrode assembly 10, the electrode assembly 10 can implement current conduction in use, to provide power to the electric apparatus that uses the cell 100.

Figure 4:
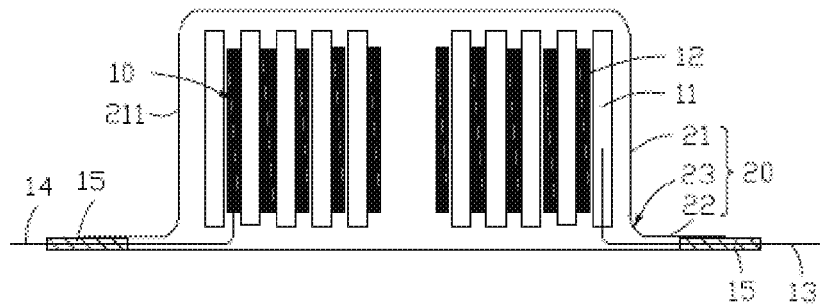
FIG. 4 is a schematic cross-sectional view of the cell shown in FIG. 3 in a direction A-A.
Figure 5:
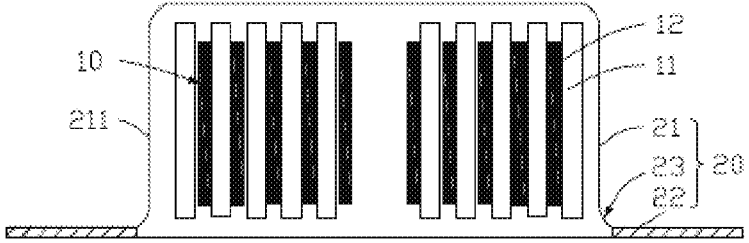
FIG. 5 is a schematic cross-sectional view of the cell shown in FIG. 3 in a direction B-B.

Referring to FIG. 4 and FIG. 5, FIG. 4 and FIG. 5 are schematic cross-sectional views of the electrode assembly 10 having not been completely packaged by the shell 20. The electrode assembly 10 includes a plurality of first electrode plates 11 and a plurality of second electrode plates 12, where the plurality of first electrode plates 11 and the plurality of second electrode plates 12 are stacked alternately, and a separator (not shown in the figure) is provided between each of the first electrode plates 11 and each of the second electrode plates 12. The separators separating the first electrode plates 11 from the second electrode plates 12 prevent short circuit caused by contact of the first electrode plates 11 with the second electrode plates 12, and also ensure normal passage of ions in a charging and discharging process.

It can be understood that, in other embodiments, the electrode assembly 10 may alternatively be formed in a winding manner, and in a piling or winding direction, a cross section of the electrode assembly 10 is of different shapes.

The electrode assembly 10 further includes a first tab 13 and a second tab 14, where the first tab 13 is connected to the first electrode plates 11, the second tab 14 is connected to the second electrode plates 12, and the first electrode plates 11 and the second electrode plates 12 extend out of the shell 20 to be connected to an external structure.

Preferably, to ensure close connection between the shell 20 and the first tab 13 and second tab 14, prevent outside impurities from entering the shell 20 to affect use of the electrode assembly 10 and also prevent, for example, an electrolyte in the shell 20 from flowing out, the cell 100 further includes insulating glue 15, where the insulating glue 15 is disposed between the first tab 13, the second tab 14 and the shell 20. The insulating glue 15 connects the first tab 13 and the second tab 14 to the shell 20 and also seals connecting locations, to improve a sealing effect of the cell 100. Further, the insulating glue 15 is a tab glue.

It can be understood that, in other embodiments, the insulating glue 15 may also be replaced with other structures with equivalent functions or effects.

In an embodiment, the first electrode plates 11 and the second electrode plates 12 are stacked in a vertical direction, and the first tab 13 and the second tab 14 extend out of two opposite sides of the shell 20, to reduce contact between the first tab 13 and the second tab 14. Further, the first electrode plates 11 are positive electrode plates, and the first tab 13 is a positive electrode tab; and accordingly, the second electrode plates 12 are negative electrode plates, and the second tab 14 is a negative electrode tab.

Preferably, the first tab 13 and the second tab 14 include at least one of element aluminum, element nickel, element manganese, element cadmium, element copper, element iron, element magnesium, element silicon, element titanium, element zirconium, element vanadium, element zinc, element lead, element sulfur, element phosphorus, element tin, element arsenic, element bismuth, and element antimony.

Materials and processes for preparing the first electrode plates 11, the second electrode plates 12, the first tab 13, the second tab 14 and the separators are common in existing technologies. Details are not described herein again.

Figure 6:
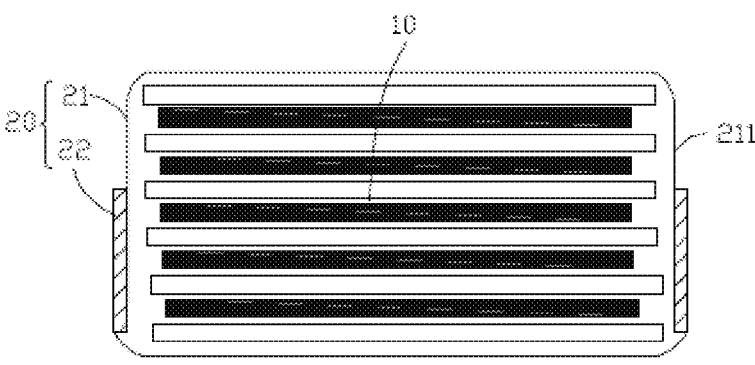
FIG. 6 is a schematic cross-sectional view of a cell using another electrode assembly (stacked structure) according to an embodiment of this application.

Referring to FIG. 6, in another embodiment, the plurality of first electrode plates 11 and the plurality of second electrode plates 12 may alternatively be piled or wound in the vertical direction.

Figure 7:
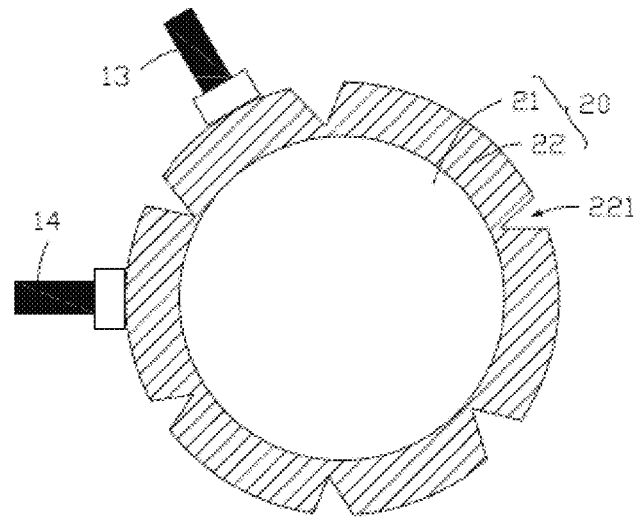
FIG. 7 is a second schematic top view of a sealing part not attached to a side wall of a packaging part in a cell.

Referring to FIG. 7, in another embodiment, the first tab 13 and the second tab 14 may alternatively be adjacent, with some distance kept between the first tab 13 and the second tab 14, to avoid contact in between.

Referring to FIG. 4 and FIG. 5, the shell 20 includes a packaging part 21 and a sealing part 22, where the packaging part 21 is connected to the sealing part 22. Further, the sealing part 22 is formed by extending the packaging part 21 outward, the electrode assembly 10 is accommodated in the packaging part 21, and the first tab 13 and the second tab 14 penetrate out of the sealing part 22 to extend out of the shell 20 so as to be able to be connected to an external structure. Observing from the angle shown in FIG. 4, the sealing part 22 is disposed at a lower end of the packaging part 21.

Further, the shell 20 includes at least one of polyethylene, polypropylene, polyester, nylon, polyphenylene oxide, aluminum foil and aluminum alloy foil, magnesium foil and magnesium alloy foil, titanium foil and titanium alloy foil, copper foil and copper alloy foil, iron foil and iron alloy foil, polyethylene terephthalate, acrylonitrile-butadiene-styrene copolymer, polystyrene, polycarbonate, and acrylonitrile-styrene copolymer. The shell 20 is made of at least one of the foregoing materials. For example, the shell 20 made of polyethylene can reduce weight of the shell 20, thereby reducing overall weight of the cell 100.

The packaging part 21 includes a side wall 211. Further, the side wall 211 is an exterior side wall 211 of the packaging part 21. With the sealing part 22 connected to the packaging part 21, the sealing part 22 is attached to the exterior side wall 211 of the packaging part 21, as shown in FIG. 6. Here, "exterior" in the exterior side wall 211 is described with respect to interior of the packaging part 21 accommodating the electrode assembly 10.

Referring to FIG. 3, notches 221 are provided in the sealing part 22, and the notches 221 are formed by recessing an exterior circumferential edge of the sealing part 22 towards a joint 23 of the packaging part 21 and the sealing part 22. The circumferential edge of the sealing part 22 is an edge of the sealing part 22 farther away from the packaging part 21, that is, an outermost location of the sealing part 22.

In an embodiment, a minimum distance between an edge of the notch 221 and the joint 23 of the packaging part 21 and the sealing part 22 is d, and d is greater than or equal to 0.5 mm. The edge of the notch 221 is an edge of the furthest distance recessed from the circumferential edge of the sealing part 22 towards the joint 23. The minimum distance d is set to be equal to or greater than 0.5 mm, so as to avoid a situation in which during the process of connecting the sealing part 22 and the packaging part 21, with an internal structure of the packaging part 21 exposed due to an excessively small distance between the sealing part 22 and the packaging part 21, the electrode assembly 10 cannot be packaged and the cell 100 cannot be used.

The notch 221 is substantially V-shaped. It can be understood that, "substantially" herein means looking like, but not absolutely V-shaped. A location of the notch 221 close to the joint 23 may be an arc transitional connection. A plurality of notches 221 are provided in the sealing part 22, and the plurality of notches 221 are arranged spaced apart from each other, such that overall area of the sealing part 22 is effectively reduced.

Figure 8:
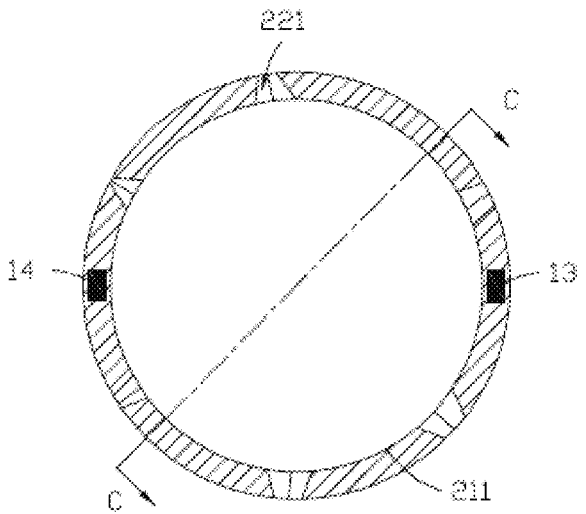
FIG. 8 is a first schematic top view of a sealing part attached to a side wall of a packaging part in the cell shown in FIG. 2.
Figure 9:
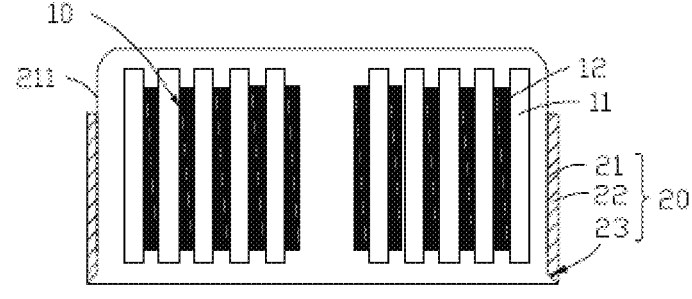
FIG. 9 is a schematic cross-sectional view of the cell shown in FIG. 8 in a direction C-C.

Referring to FIG. 8 and FIG. 9, FIG. 8 illustrates that the sealing part 22 is bent in a location of the joint 23 and then attached to the side wall 211 of the packaging part 21. With notches 221 provided in the sealing part 22, area of the sealing part 22 is reduced. When attached to the packaging part 21, the sealing part 22 can be flatly attached to the side wall 211 without creases, thereby reducing overall volume of the cell 100 and increasing spatial utilization of the sealing part 22.

Figure 10:
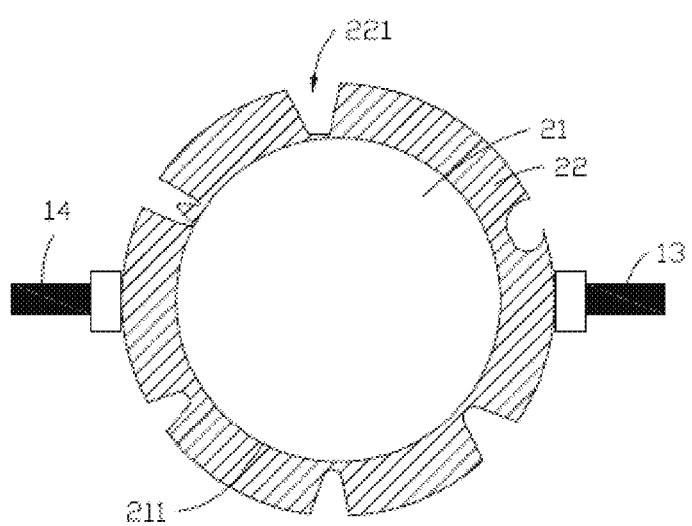
FIG. 10 is a third schematic top view of a sealing part not attached to a side wall of a packaging part in a cell.
Figure 11:
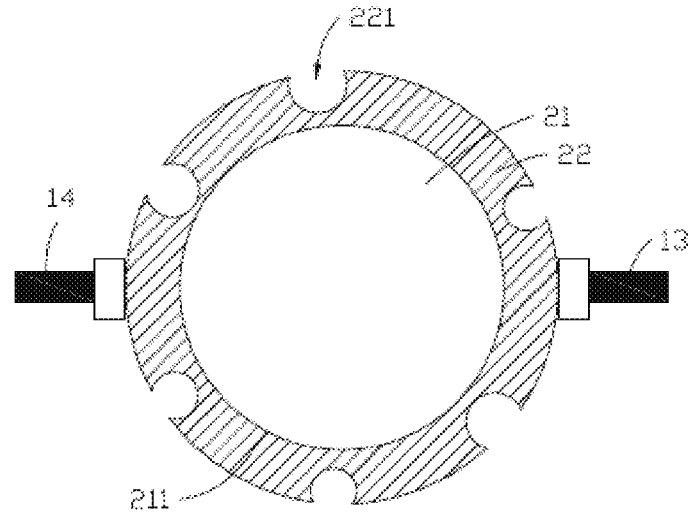
FIG. 11 is a fourth schematic top view of a sealing part not attached to a side wall of a packaging part in a cell.
Figure 12:
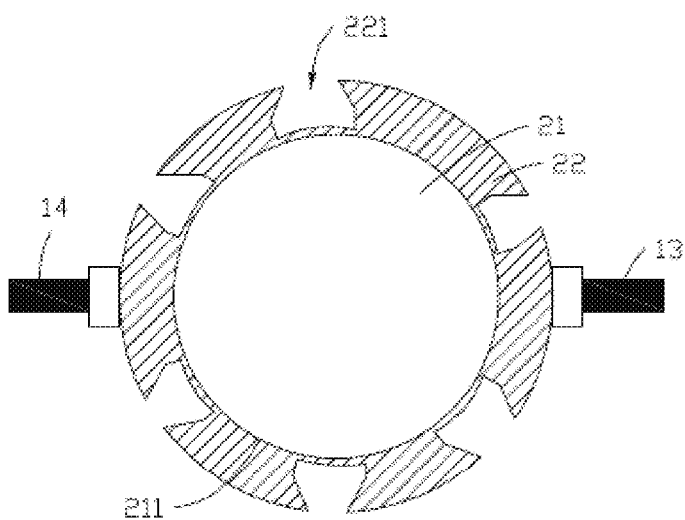
FIG. 12 is a fifth schematic top view of a sealing part not attached to a side wall of a packaging part in a cell.

Referring to FIG. 10, FIG. 11 and FIG. 12, in other embodiments, the notch 221 is not limited to substantially V-shaped. Further, the notch 221 may also be U-shaped, polygonal, irregular arc-shaped, or the like. For example, as shown in FIG. 10, a plurality of notches 221 of different shapes are provided in the sealing part 22. As shown in FIG. 11, the notches 221 may also be arc-shaped or semi-circular, and a plurality of arc-shaped or semi-circular notches 221 are arranged equidistantly. As shown in FIG. 12, the notches 221 may also be resembling a trapezoidal shape, and a plurality of trapezoidal notches 221 are arranged equidistantly. With the notches 221 of different shapes, an area of the sealing part 22 can be changed, such that the cell 100 of different sizes can be packaged in this way, thereby increasing spatial utilization of the sealing part 22.

Figure 13:
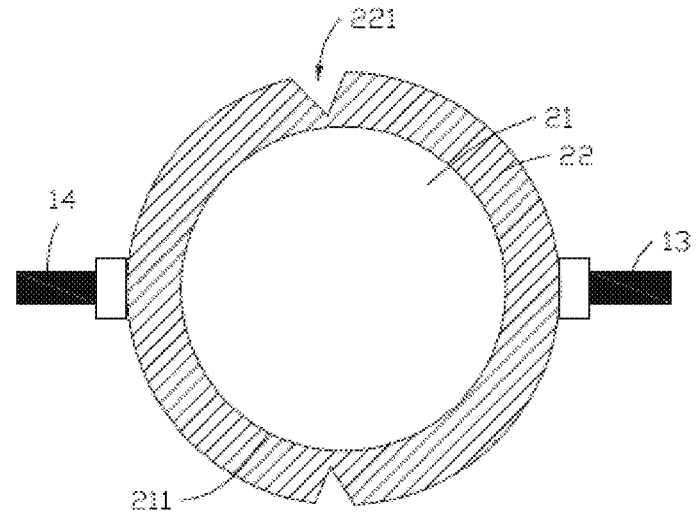
FIG. 13 is a sixth schematic top view of a sealing part not attached to a side wall of a packaging part in a cell.
Figure 14:
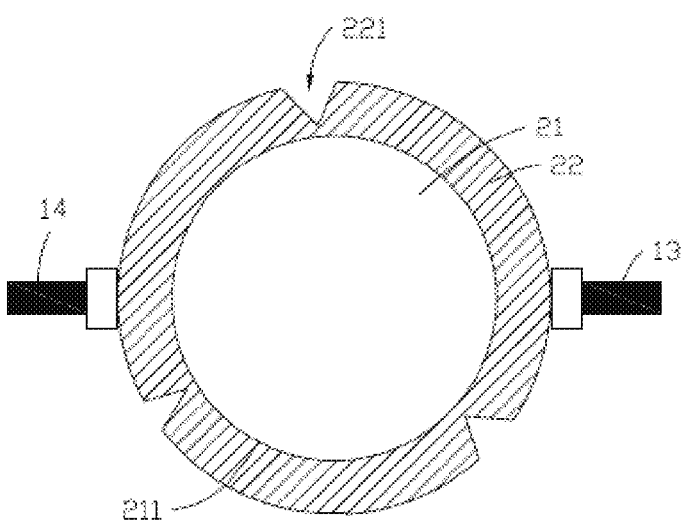
FIG. 14 is a seventh schematic top view of a sealing part not attached to a side wall of a packaging part in a cell.

Referring to FIG. 13 and FIG. 14, in other embodiments, the quantity of the notch 221 may also be set depending on different needs. For example, in FIG. 13, two notches 221 are provided in the sealing part 22, and the two notches 221 are arranged symmetrically. In FIG. 14, three notches 221 are provided in the sealing part 22, and the three notches 221 are arranged spaced apart. With the notches 221 of different quantities, an area of the sealing part 22 can also be changed, such that the cell 100 of different sizes can be packaged in this way, thereby increasing spatial utilization of the sealing part 22.

It can be understood that, the quantity and shape of the notch 221 are not limited thereto.

Figure 15:
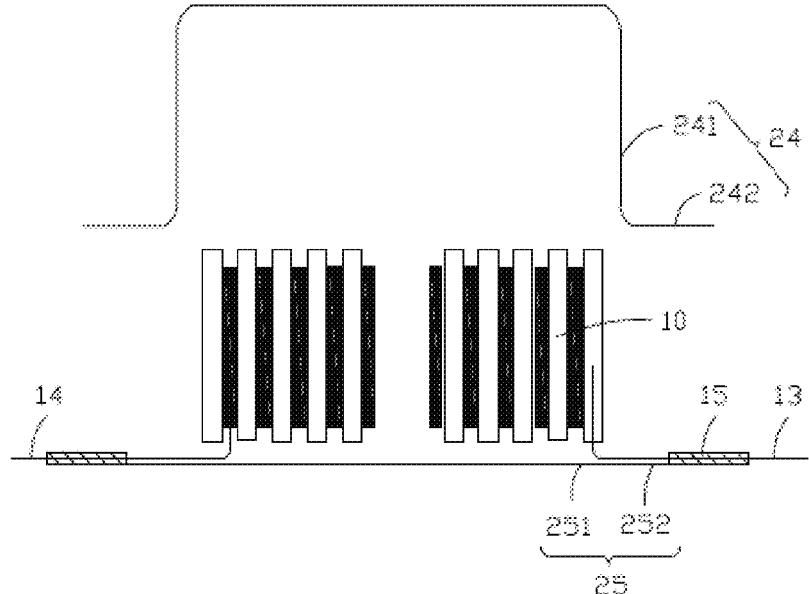
FIG. 15 is a schematic exploded view of the cell shown in FIG. 6.

The shell 20 can be divided into the packaging part 21 and the sealing part 22 through regional division. Referring to FIG. 15, the shell 20 specifically includes a first packaging film 24 and a second packaging film 25 based on the structure. The first packaging film 24 includes a first part 241 and a first edge part 242 connected to the first part 241, and the second packaging film 25 includes a second part 251 and a second edge part 252 connected to the second part 251; and the first part 241 and the second part 251 enclose the packaging part 21, and the first edge part 242 and the second edge part 252 are connected to form the sealing part 22.

In this embodiment, the first part 241 is an inverted U-shaped first accommodating cavity, and the first edge part 242 extends a preset length from an end of the first part 241 close to the packaging part 21 along two opposite sides in a horizontal direction. The second part 251 is flat, and the second edge part 252 extends a preset length from an end of the second part 251 along two opposite sides in a horizontal direction and is corresponding to the first edge part 242.

The flat second part 251 seals the inverted U-shaped first part 241 to form the packaging part 21. The first edge part 242 and the second edge part 252 are connected to form the sealing part 22.

Figure 16:
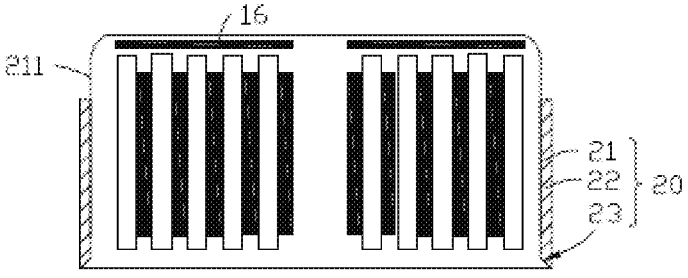
FIG. 16 is a schematic cross-sectional view of a cell including an insulating sheet according to an embodiment of this application.

Referring to FIG. 16, with the shell 20 made of metal-containing material, to prevent the cell 100 from short circuit, the cell 100 further includes an insulating sheet 16, where the insulating sheet 16 is disposed between the electrode assembly 10 and the shell 20 to avoid contact between the electrode assembly 10 and the shell 20. Further, the insulating sheet 16 is an insulation washer.

It can be understood that, in other embodiments, the insulating sheet 16 is not limited thereto and may also be replaced with other forms, for example, replaced with insulation paint with an insulation function, which can also implement an insulation effect when spray-coated on the shell 20.

Embodiment 2

Figure 17:
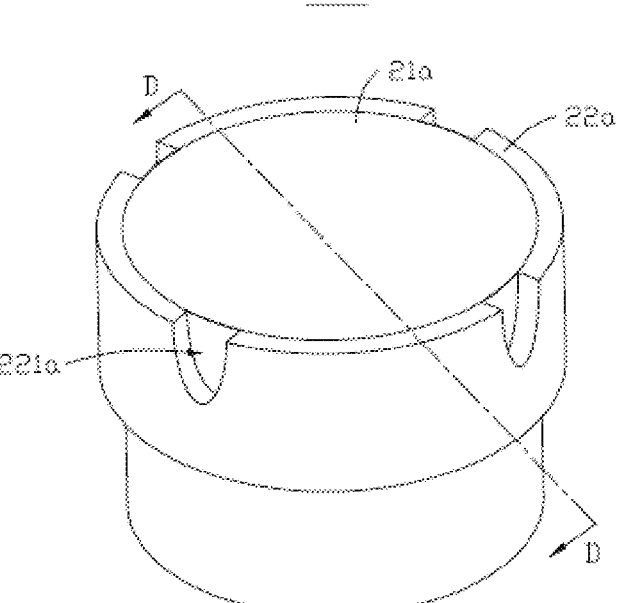
FIG. 17 is a stereoscopic schematic diagram of a cell according to another embodiment of this application.
Figure 18:
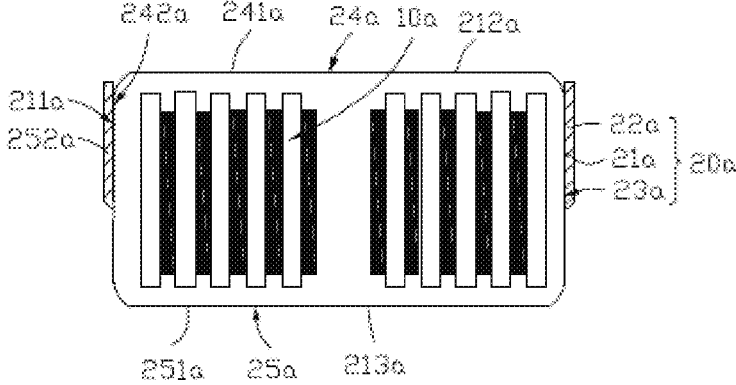
FIG. 18 is a schematic cross-sectional view of the cell shown in FIG. 17 in a direction D-D.

Referring to FIG. 17 and FIG. 18, this application further provides another cell 100a. The cell 100a is substantially the same as the cell 100 in Embodiment 1 and differs in that the sealing part 22a is formed by extending a side wall 211a of the packaging part 21a outward. Observing in a direction shown in FIG. 18, the sealing part 22a is generally located in the middle of the packaging part 21a.

The packaging part 21a includes a first end surface 212a and a second end surface 213a, where the first end surface 212a is opposite the second end surface 213a, the first end surface 212a and the second end surface 213a are respectively connected to the side wall 211a, and a distance from the joint 23a of the sealing part 22a and the packaging part 21a to the first end surface 212a is greater than or equal to a distance from the joint 23a to the second end surface 213a.

With the distance from the joint 23a to the first end surface 212a greater than or equal to the distance from the joint 23a to the second end surface 213a and the sealing part 22a bent and attached to the side wall 211a of the packaging part 21a, an extension distance of the sealing part 22a along the side wall 211a can be reduced, and the sealing part 22a can be better attached to the side wall 211a by itself.

Specifically, in this embodiment, the first part 241a of the first packaging film 24a is an inverted U-shaped first accommodating cavity, the second part 251a of the second packaging film 25a is a U-shaped second accommodating cavity, and the inverted U-shaped first part 241a and the U-shaped second part 251a are sealed to form the packaging part 21a. The first edge part 242a extends a preset length from an end of the first part 241a close to the second edge part 252a along two opposite sides in a horizontal direction, the second edge part 252a extends a preset length from an end of the second part 251a close to the first edge part 242a along two opposite sides in a horizontal direction and is corresponding to the first edge part 242a, and the first edge part 242a and the second edge part 252a form the sealing part 22a.

Embodiment 3

Figure 19:
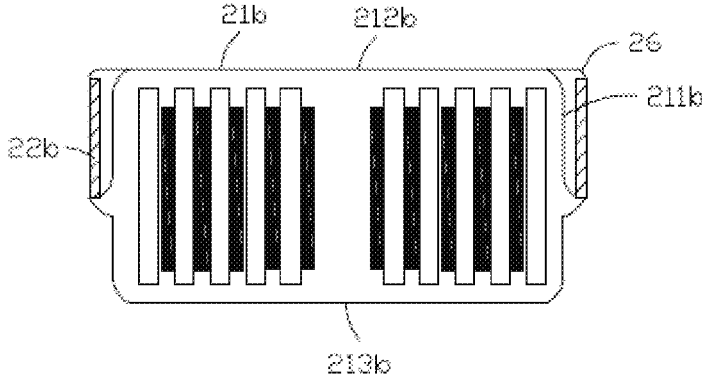
FIG. 19 is a schematic cross-sectional view of a cell including a first bonding member according to an embodiment of this application.

Referring to FIG. 19, the cell 100b in Embodiment 3 is substantially the same as the cell 100a in Embodiment 2 and differs in that the cell 100b in Embodiment 3 further includes a first bonding member 26, where one end of the first bonding member 26 is disposed on the side wall 211b, the first end surface 212b, or the second end surface 213b, and the other end of the first bonding member 26 is disposed on a surface of the sealing part 22b facing away from the packaging part 21b, to fix the sealing part 22b to the packaging part 21b.

With an extension length of the bent sealing part 22b along the side wall 211b smaller than a distance of the side wall 211b, the first bonding member 26 is attached to the side wall 211b and the sealing part 22b.

With the sealing part 22b bent in a different direction, an end of the first bonding member 26 is attached to the first end surface 212b or the second end surface 213b.

It can be understood that, the first bonding member 26 is also applicable to the cell 100 in Embodiment 1.

By using the first bonding member 26 to bond the sealing part 22b and the packaging part 21b, it can be prevented that the sealing part 22b springs back after being bent and thereby affects assembling of the cell 100b in the battery.

The first bonding member 26 includes at least one of materials including polyethylene oxide, polyvinylidene fluoride, styrene-butadiene rubber, vinylidene fluoride and hexafluoropropene polymer, polyvinylidene fluoride, modified polyvinylidene fluoride, polyacrylate, modified polyacrylate, modified polyethylene, modified polydiene, and the like.

In this embodiment, the first bonding member 26 is adhesive paper. It can be understood that, in other embodiments, the first bonding member 26 may also be replaced with other structures with equivalent functions or effects.

Embodiment 4

Figure 20:
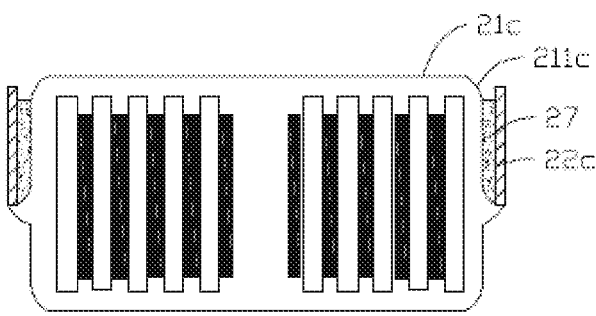
FIG. 20 is a schematic cross-sectional view of a cell including a second bonding member according to an embodiment of this application.

Referring to FIG. 20, the cell 100c in Embodiment 4 is substantially the same as the cell 100a in Embodiment 2 and differs in that the cell 100c in Embodiment 4 further includes a second bonding member 27, where the second bonding member 27 is disposed between the side wall 211c and a surface of the sealing part 22c facing toward the packaging part 21c, to fix the sealing part 22c to the packaging part 21c.

The second bonding member 27 disposed between the packaging part 21c and the sealing part 22c avoids that the sealing part 22c springs back after being bent and affects assembling of the cell 100c in the battery.

The second bonding member 27 includes at least one of materials including polyethylene oxide, polyvinylidene fluoride, styrene-butadiene rubber, vinylidene fluoride and hexafluoropropene polymer, polyvinylidene fluoride, modified polyvinylidene fluoride, polyacrylate, modified polyacrylate, modified polyethylene, modified polydiene, and the like.

In this embodiment, the second bonding member 27 is double-sided adhesive tape. It can be understood that, in other embodiments, the second bonding member 27 may also be replaced with other structures with equivalent functions or effects.

Embodiment 5

Figure 21:
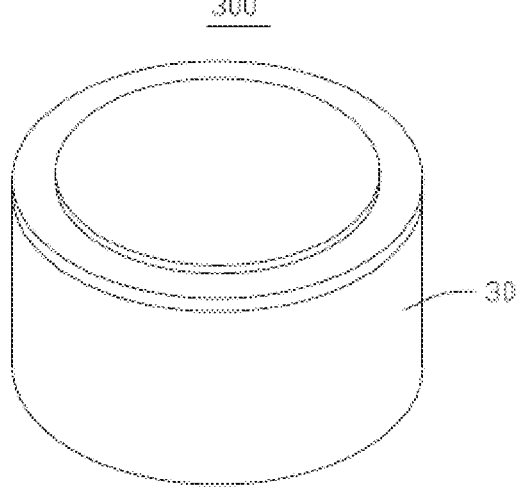
FIG. 21 is a stereoscopic schematic diagram of a battery according to an embodiment of this application.

Referring to FIG. 21, an embodiment of this application further provides a battery 300, including a housing 30 and the cell 100, 100a, 100b, or 100c in any one of the foregoing embodiments, where the cell 100, 100a, 100b, or 100c is accommodated in the housing 30. The battery 300 including any one of the cell 100, 100a, 100b, or 100c in the foregoing embodiments has all beneficial effects of the cell 100, 100a, 100b, or 100c. Details are not described herein again.

It can be understood that, in this embodiment, the battery further includes structures such as a circuit board (not shown in the figure) and a connecting piece (not shown in the figure), where the tabs on the cell 100, 100a, 100b, or 100c are welded to the circuit board through the connecting piece. Such structures are common in the field of batteries. Details are not described herein again.

With the tabs of the cell 100, 100a, 100b, or 100c serving as a positive electrode and a negative electrode of the battery, the battery can be directly used in the electric apparatus.

Embodiment 6

Figure 22:
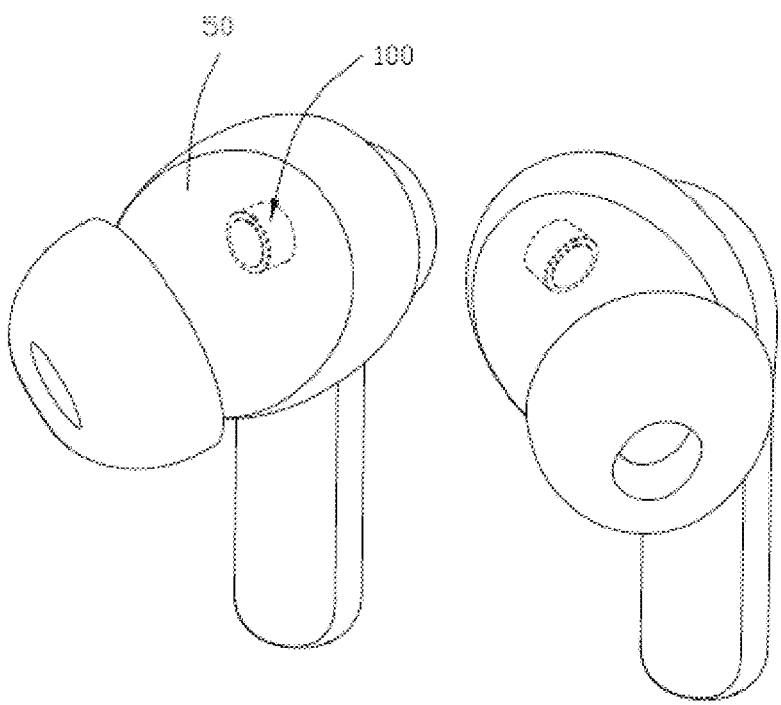
FIG. 22 is a stereoscopic schematic diagram of an electric apparatus according to an embodiment of this application.

Referring to FIG. 22, an embodiment of this application further provides an electric apparatus 500, including a body 50 and the battery 300 in the foregoing embodiments, where the battery 300 is accommodated in the body and configured to provide power to the body 50, such that the body 50 can be powered for use. The electric apparatus 500 including the battery 300 in the foregoing embodiments has all beneficial effects of the battery 300. Details are not described herein again.

In an embodiment, the electric apparatus 500 is specifically a wireless Bluetooth headset. It can be understood that, in other embodiments, the electric apparatus 500 may also be other smart wearable devices, such as a sports watch and a small lighting device.

In conclusion, for the cell 100, the battery 300, and the electric apparatus 500 provided in the embodiments of this application, by providing notches 221 in the sealing part 22, an area for attaching the sealing part 22 to the packaging part 21 is thereby reduced, to avoid creases of the sealing part 22 when disposed on the packaging part 21. Therefore, a volume of the cell 100 can be reduced, and spatial utilization can be increased in the structure that uses the cell 100.

In addition, those of ordinary skill in the art should be aware of that the foregoing embodiments are only intended to describe this application, but not to limit this application. Appropriate modifications and variations made to the foregoing embodiments without departing from the essential spirit and scope of this application all fall within the scope of this application.

What is claimed is:

1. A cell, comprising:
an electrode assembly comprising tabs; and
a shell, the electrode assembly being disposed in the shell;
wherein,
the shell comprises a packaging part and a sealing part connected to the packaging part, wherein the sealing part is formed by extending the packaging part outwards, the electrode assembly is located in the packaging part, and the tabs penetrate out of the sealing part; and
the packaging part comprises a side wall, wherein notches are provided in the sealing part, the notches are formed by recessing an exterior circumferential edge of the sealing part towards a joint of the sealing part and the packaging part, and the sealing part is attached to the side wall;
the packaging part further comprises a first end surface, and a second end surface opposite to the first end surface; wherein each of the first end surface and the second end surface is connected to the side wall,
wherein the cell further comprises a first bonding member, wherein one end of the first bonding member is disposed on the side wall, the first end surface, or the second end surface; and an other end of the first bonding member is disposed on a surface of the sealing part facing away from the packaging part, to fix the sealing part to the packaging part;
wherein, along an axial direction in which the sealing part extends from the joint of the sealing part and the packaging part, a length of the first bonding member is greater than a length of the sealing part.

2. The cell according to claim 1, wherein the shell comprises a first packaging film and a second packaging film;
the first packaging film comprises a first part and a first edge part connected to the first part, and the second packaging film comprises a second part and a second edge part connected to the second part; and
the first part and the second part enclose the packaging part, and the first edge part and the second edge part are connected to form the sealing part.

3. The cell according to claim 2, wherein the first part is recessed to form a first accommodating cavity, wherein a vertical section of the first accommodating cavity is inverted U-shaped; and the second part is flat and seals the first part to form the packaging part.

4. The cell according to claim 2, wherein the first part is recessed to form a first accommodating cavity, wherein a vertical section of the first accommodating cavity is inverted U-shaped; the second part is recessed to form a second accommodating cavity, wherein a vertical section of the second accommodating cavity is U-shaped; and the first accommodating cavity and the second accommodating cavity enclose the packaging part.

5. The cell according to claim 1, wherein the notches are at least one of arc-shaped notches, V-shaped notches, semi-circular notches, U-shaped notches, or polygonal notches.

6. The cell according to claim 1, wherein a minimum distance between an edge of the notches and the joint of the packaging part and the sealing part is greater than or equal to 0.5 mm.

7. The cell according to claim 1, wherein a distance from the joint of the sealing part and the packaging part to the first end surface is greater than or equal to a distance from the joint to the second end surface.

8. The cell according to claim 1, wherein the cell further comprises a second bonding member, wherein the second bonding member is disposed between the side wall and a surface of the sealing part facing toward the packaging part to fix the sealing part to the packaging part.

9. A battery, comprising a housing and the cell according to claim 1, wherein the cell is accommodated in the housing.

10. The battery according to claim 9, wherein the shell comprises a first packaging film and a second packaging film;

the first packaging film comprises a first part and a first edge part connected to the first part, and the second packaging film comprises a second part and a second edge part connected to the second part; and the first part and the second part enclose the packaging part, and the first edge part and the second edge part are connected to form the sealing part.

11. The battery according to claim 10, wherein the first part is recessed to form a first accommodating cavity, wherein a vertical section of the first accommodating cavity is inverted U-shaped; and the second part is flat and seals the first part to form the packaging part.

12. The battery according to claim 10, wherein the first part is recessed to form a first accommodating cavity, wherein a vertical section of the first accommodating cavity is inverted U-shaped; the second part is recessed to form a second accommodating cavity, wherein a vertical section of the second accommodating cavity is U-shaped; and the first accommodating cavity and the second accommodating cavity enclose the packaging part.

13. The battery according to claim 9, wherein the notches are at least one of arc-shaped notches, V-shaped notches, a semi-circular notches, U-shaped notch, or polygonal notches.

14. The battery according to claim 9, wherein a minimum distance between an edge of the notches and the joint of the packaging part and the sealing part is greater than or equal to 0.5 mm.

15. The battery according to claim 9, wherein a distance from the joint of the sealing part and the packaging part to the first end surface is greater than or equal to a distance from the joint to the second end surface.

16. The battery according to claim 9, wherein the cell further comprises a second bonding member, wherein the second bonding member is disposed between the side wall and a surface of the sealing part facing toward the packaging part, to fix the sealing part to the packaging part.

17. An electric apparatus, comprising a body, the battery according to claim 9, wherein the battery is accommodated in the body.

18. The battery according to claim 1, wherein the first bonding member comprises at least one material selected from the group consisting of polyethylene oxide, polyvinylidene fluoride, modified polyvinylidene fluoride, styrene-butadiene rubber, vinylidene fluoride and hexafluoropropene copolymer, polyacrylate, modified polyacrylate, and modified polydiene.

* * * * *